(12) United States Patent
Gerstenberger et al.

(10) Patent No.: US 7,885,212 B2
(45) Date of Patent: Feb. 8, 2011

(54) NETWORK CONTROLLED THROUGHPUT FOR ENHANCED UPLINK FACH

(75) Inventors: Dirk Gerstenberger, Stockholm (SE); Johan Bergman, Stockholm (SE); Martin Israelsson, Spånga (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 152 days.

(21) Appl. No.: 12/337,276

(22) Filed: Dec. 17, 2008

(65) Prior Publication Data

US 2009/0196195 A1 Aug. 6, 2009

Related U.S. Application Data

(60) Provisional application No. 61/026,633, filed on Feb. 6, 2008.

(30) Foreign Application Priority Data

Aug. 12, 2008 (WO) ................ PCT/SE2008/050917

(51) Int. Cl.
*H04B 7/005* (2006.01)

(52) U.S. Cl. ........................ 370/278; 370/329; 370/400; 455/422

(58) Field of Classification Search ................. 370/278, 370/252, 253, 335, 320, 342, 350, 352, 329, 370/328, 400, 401; 455/502–503, 561, 422
See application file for complete search history.

(56) References Cited

U.S. PATENT DOCUMENTS

2003/0194992 A1* 10/2003 Kim et al. ................ 455/414.1
2005/0117551 A1* 6/2005 Han et al. .................... 370/335
2005/0207359 A1 9/2005 Hwang et al.
2005/0266846 A1* 12/2005 Kim ........................... 455/436
2007/0281728 A1* 12/2007 Charriere et al. ............ 455/522

FOREIGN PATENT DOCUMENTS

EP 1868403 A1 12/2007

OTHER PUBLICATIONS

International Search Report for PCT/SE2008/050917, mailed Jan. 5, 2009.
Written Opinion for PCT/SE2008/050917, mailed Jan. 5, 2009.
Sharma, G., et al. "Moving Towards HSUPA (High Speed Uplink Packet Access): A Complete 3.5 G Wireless System," Personal Wireless Communications, ICPWC, 2005 IEEE International Ional Conference on New Delhi, India, Jan. 23-25, 2005, pp. 174-177, XP010798540.
Interdigital, "Intercell Interference with Enhanced Uplink for Cell_FACH," 3GPP TSG-RAN WG2#60 BIS, vol. Tdoc, No. R2-080411, Jan. 14, 2008, pp. 1-3, retrieved from www.3gpp.org on Dec. 10, 2008, XP002508161.
Interdigital, "Max Transport Block Size Limit for EUL in Cell_FACH UEs," 3GPP TSG-RAN WG3#59 BIS, No. R3-080884, Mar. 31, 2008, p. 1, retrieved from www.3gpp.org on Dec. 10, 2008, XP002508162.

* cited by examiner

*Primary Examiner*—Ricky Ngo
*Assistant Examiner*—Gary Mui
(74) *Attorney, Agent, or Firm*—Potomac Patent Group PLLC

(57) ABSTRACT

Systems and methods according to these exemplary embodiments provide for network control of interference associated with uplink transmissions by user equipments, UEs, operating in a random access state, e.g., the CELL_FACH state. A radio network controller, RNC, can determine, and then transmit, a limitation on uplink transmissions for such UEs, e.g., a maximum transport block size, TBS.

30 Claims, 9 Drawing Sheets

NETWORK CONTROLLED THROUGHPUT FOR ENHANCED UPLINK FACH

RELATED APPLICATIONS

This application claims priority and benefit from International Application No. PCT/SE2008/050917, filed Aug. 12, 2008, which claims priority to U.S. Provisional Application No. 61/026,633, filed Feb. 6, 2008, the entire teachings of which are incorporated herein by reference.

TECHNICAL FIELD

The present invention relates generally to telecommunications systems, and in particular to methods and systems for controlling uplink throughput and interference in radiocommunications systems.

BACKGROUND

Radiocommunication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also, to provide the capabilities needed to support next generation radiocommunication applications, while at the same time using legacy infrastructure, network operators could deploy hybrid networks wherein a next generation radiocommunication system is overlaid onto an existing circuit-switched or packet-switched network as a first step in the transition toward an all IP-based network.

One example of such an evolving network structure can be seen in the evolution of wideband code division multiple access (WCDMA) systems. Specified by 3GPP TSG RAN, WCDMA systems have evolved from their initial role as a 3G mobile communication system through the addition of High Speed Downlink Packet Access (HSDPA) in Release 5 and, subsequently, Enhanced Uplink (EUL) in Release 6 (which are sometimes jointly referred to as High Speed Packet Access (HSPA)) to provide data bandwidths which support broadband mobile data applications. For example, downlink and uplink data rates of up to approximately 14 and 5.7 Mbit/s, respectively, may be supported in systems designed in accordance with Release 6 of the HSPA standards. Among other things, such data rate improvements are achieved through the use of techniques such as hybrid automatic retransmission request (HARQ) with soft combining, higher order modulation, scheduling and rate control.

Of particular interest for the present discussion associated with the uplink is the scheduling feature of HSPA systems. The EUL in Release 6 introduces a new enhanced dedicated channel (E-DCH) which supports uplink data transmissions from a user's equipment (UE). The EUL is non-orthogonal such that uplink transmissions from different UEs interfere with one another. Thus, the shared resource on the EUL is the amount of tolerable interference in a cell, i.e., the total received power at a NodeB. Accordingly, transmissions on the E-DCH are controlled by a scheduler, located in the NodeB, which controls when and at what data rate the UE is permitted to transmit data.

UEs operating in WCDMA systems, including those designed in accordance with the HSPA standards, typically operate in one of three states shown in FIG. 1 in order to balance power consumption against transmission delay/response time. Therein, state 2 represents a "sleep" mode wherein the UE only occasionally powers up its transceiver equipment to check for paging messages. In the random access (CELL_FACH) state 4, UEs are typically able to transmit small amounts of data as part of a random access (RACH) process which leads to a transition to the active (CELL_DCH) state 6, in which UEs transmit and receive data normally using the E-DCH and a High-Speed Downlink Shared Channel (HS-DSCH) channels, respectively.

In some areas, HSPA may become a replacement to asymmetric digital subscriber line (ADSL) service for connecting PCs to the Internet. This change in user behavior has a corresponding impact on traffic load and network characteristics. For example, PCs run a range of applications that communicate in the background without the need for end-user interaction. Among other things, such background traffic includes keep-alive messages, probes for software updates, and presence signaling. To efficiently support this type of traffic, the 3GPP has worked to enhance the CELL_FACH state 4 in Releases 7 and 8 of the WCDMA standards. More specifically, in Release 7, HSDPA has been activated for UEs operating in the CELL_FACH state 4. Thus, in the downlink, UEs monitor the HSDPA control channels to detect scheduling information for their own specific identities (H-RNTI) and are able to receive data more rapidly from the network while in the random access state.

In Release 8 of WCDMA, the uplink has also been improved by activating E-DCH for UEs operating in the CELL_FACH. Transmission begins by the UE ramping up power on the transmission of random preamble sequences (as is done in Rel-99 of WCDMA) to establish contact with a serving NodeB, i.e., until an acknowledge with resource allocation message (ACK) or a not acknowledged message (NACK), is received by the UE. After having detected the preamble, the Node-B which is associated with a serving cell assigns the UE to a common E-DCH configuration (managed by that Node-B). The UE may then start transmitting data on the common E-DCH with contention being resolved by means of UE identities in the E-DCH transmissions. By enabling the UE to use the E-DCH for uplink transmissions while in the CELL_FACH state 4, a UE can then be efficiently moved to the CELL_DCH state 6 for continuous transmission. This enhancement significantly improves user perception of performance compared with systems built in accordance with Release 6 of the WCDMA standards.

However, by enabling UEs in the CELL_FACH state 4 to transmit and receive at higher data rates, there also comes the corresponding challenge of dealing appropriately with their increased contributions to the interference situation, e.g., intercell interference. It should be noted that the intercell interference situation is potentially more severe in CELL_FACH state 4 than in CELL_DCH state 6 due to the lack of soft handover, i.e. lack of transmit power control commands from non-serving cells and relative scheduling grants from non-serving cells.

SUMMARY

The following exemplary embodiments address issues associated with uplink interference associated with UEs operating on the EUL by enabling the network, e.g., a radio network controller (RNC), to control one or more parameters associated with uplink throughput. For example, an RNC may place limitations on UE uplink transmissions while in a random access state, e.g., the CELL_FACH state.

According to one exemplary embodiment, a method includes the steps of determining, at an RNC, at least one throughput parameter associated with transmissions by user equipment on an uplink channel, and transmitting, from the RNC, the at least one throughput parameter toward another network node. This provides, among other advantages, a mechanism for controlling intercell interference associated with such transmissions.

According to another exemplary embodiment, a radio network controller (RNC) includes a processor for controlling one or more network nodes by determining at least one throughput parameter associated with transmissions by user equipment on an uplink channel and by transmitting the at least one throughput parameter toward the one or more network nodes. This provides, among other advantages, a mechanism for controlling intercell interference associated with such transmissions.

According to still another exemplary embodiment, a network node includes a wireline interface for sending and receiving signals, including receiving a signal which indicates at least one throughput parameter associated with transmissions by user equipment on an uplink channel when the user equipment is operating in a random access state, a transceiver for sending and receiving signals over an air interface toward and from the user equipment, a processor, connected to the transceiver, for processing the at least one throughput parameter and for generating a serving grant signal based on the at least one throughput parameter, wherein the transceiver transmits the serving grant signal toward the user equipment. This provides, among other advantages, a mechanism for controlling intercell interference associated with such transmissions.

According to another exemplary embodiment, a method includes the steps of: receiving a signal which indicates at least one throughput parameter associated with transmissions by user equipment on an uplink channel when the user equipment is operating in a random access state, generating a serving grant signal based on the at least one throughput parameter, and transmitting the serving grant signal toward the user equipment.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims. The following embodiments are discussed, for simplicity, with regard to the terminology and structure of WCDMA systems. However, the embodiments to be discussed next are not limited to WCDMA systems but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
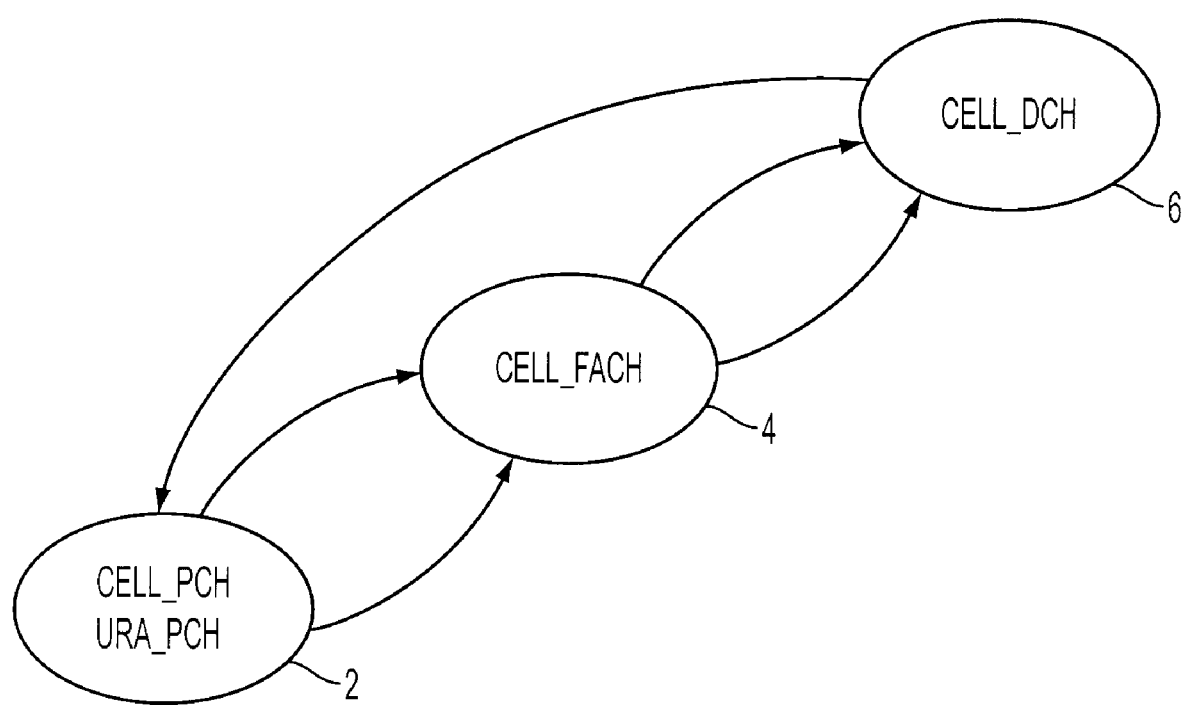
FIG. 1 depicts operating states of a conventional radiocommunication system.
Figure 2:
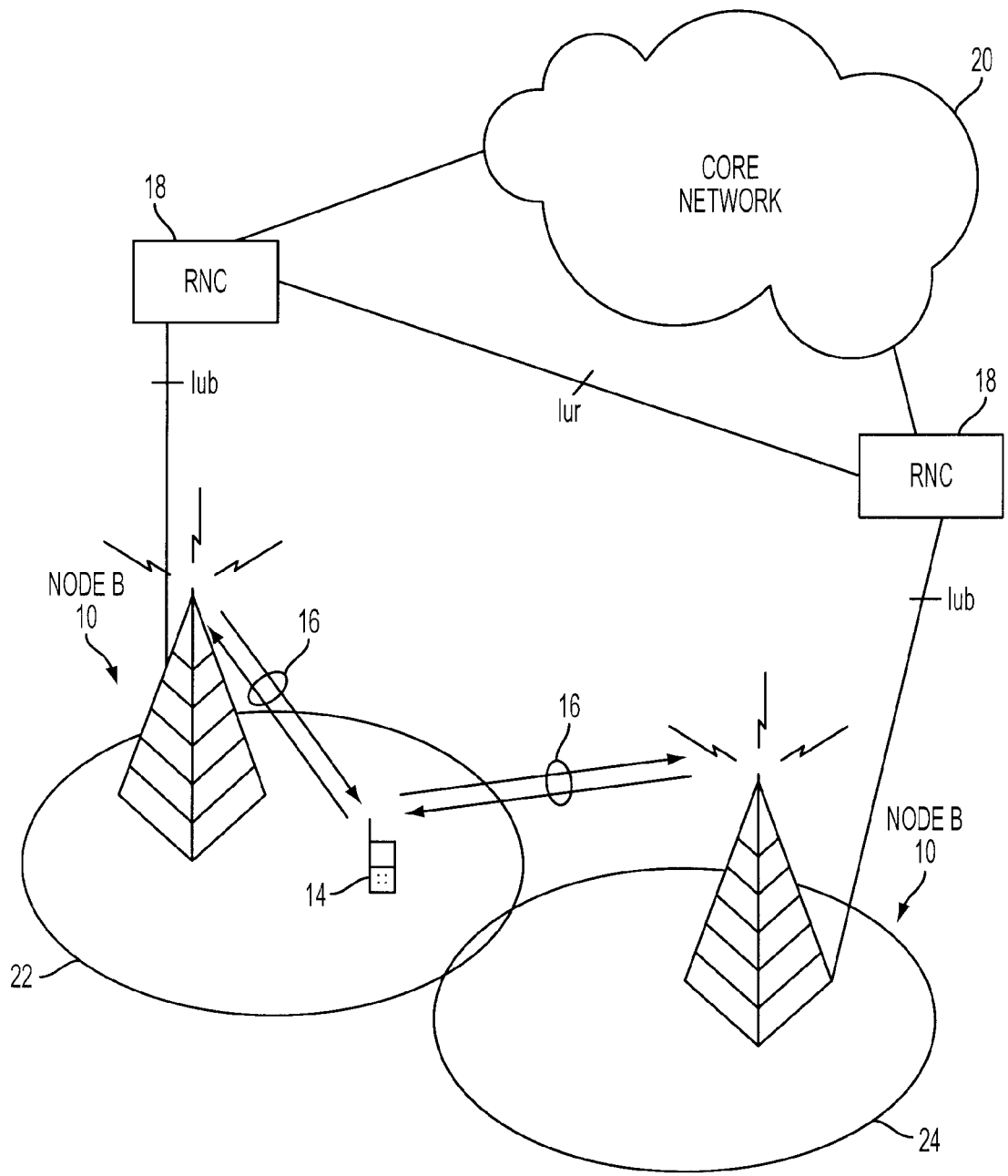
FIG. 2 depicts elements of a radiocommunication system in which exemplary embodiments can operate.

In order to provide some context for the following discussion, consider the exemplary WCDMA radiocommunication system illustrated in FIG. 2. Therein, two NodeBs 10 and one UE 14 are shown, although it will be appreciated that actual implementations will typically have more of both. The UE 14 uses uplink and downlink channels 16 to communicate wirelessly with one or more of the NodeBs 10, e.g., the E-DCH and HS-DSCH channels described above, over an air interface. The two NodeBs 10 are linked to corresponding Radio Network Controllers (RNC) 18, e.g., via wireline or wirelessly, via which links signals can be transmitted between these entities using the standardized Iub (or Iur/Iub) interface. One RNC 18 may control more than one NodeB 10. The RNCs 18 are connected to a Core Network 20. Each NodeB 10 transmits signals to, and receives signals from, UEs 14 within a particular geographic area or cell 22 and 24, respectively. A UE 14 will typically be connected to one serving NodeB 10 or cell 22, but may also receive signals from one or more neighboring NodeB 10 or cell 24. Depending upon its distance from its serving NodeB, a UE 14 can be characterized as being a "cell edge" user, e.g., if it is close to a point where it would be handed off to a neighbor. The NodeB 10 can categorize each UE 14 which is connected thereto as being a cell edge user (or not) based upon information which it receives from either the UE 14 or the RNC 18, e.g., channel quality information (CQI), UE transmit power headroom (UPH), transmit power commands (TPC), round trip time (RTT), etc., which is indicative of its distance from the NodeB 10. For example, the NodeB 10 could estimate that a UE 14 with a relatively small CQI, a relatively small UPH and/or a relatively large RTT has a relatively high probability of being relatively far away from the NodeB 10 (i.e., is likely to be a cell edge UE 14) and hence has a relatively high probability of causing intercell interference towards another NodeB 10.

Figure 3:
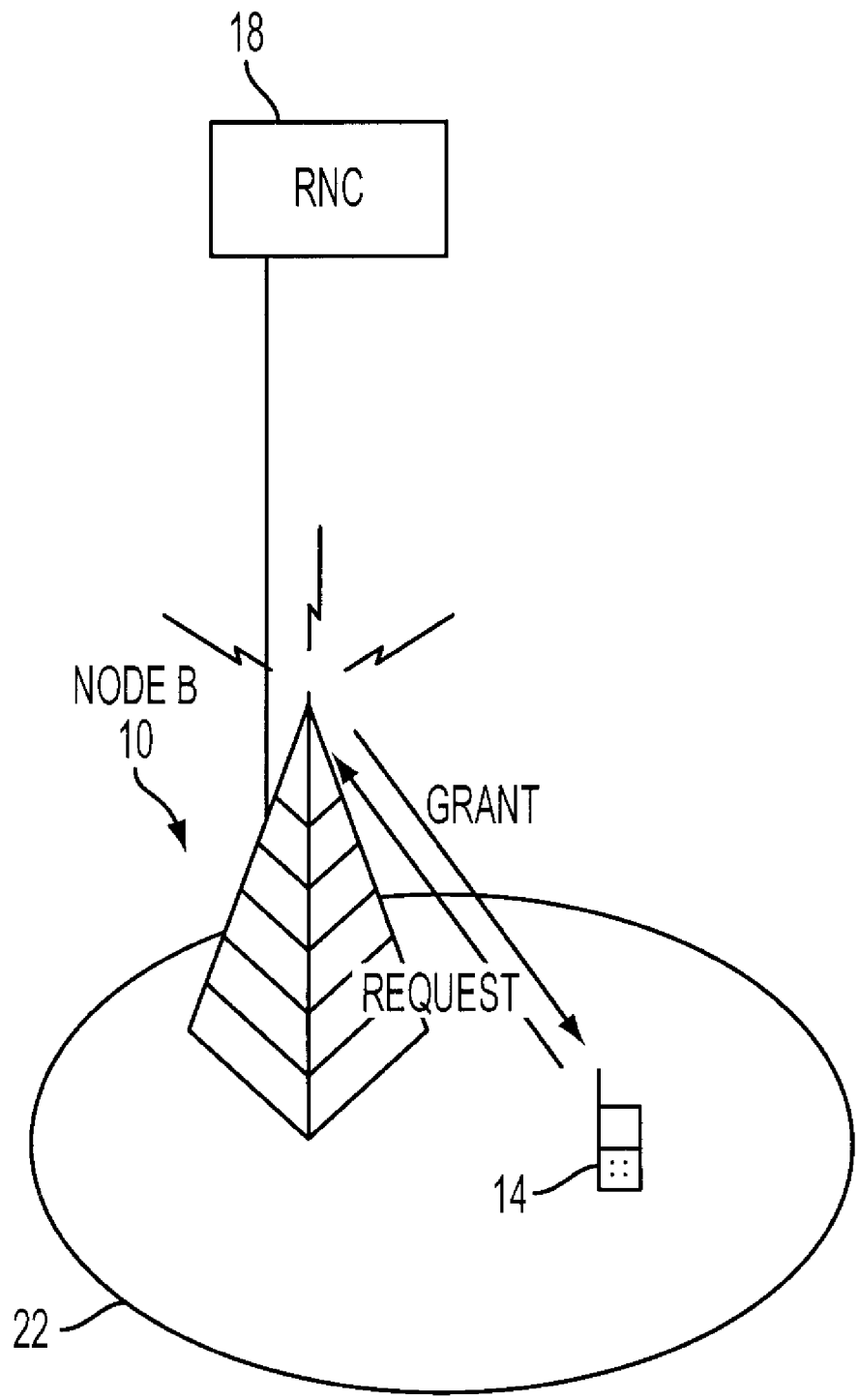
FIG. 3 illustrates elements of the radiocommunication system of FIG. 2 with scheduling signaling.

For the EUL, the scheduler (not shown in FIG. 2) is located in the NodeB 10, to control the activity of various UEs 14 within its cell 22. In order to determine appropriate resource allocation for uplink transmissions on the E-DCH (whether in CELL_FACH state 4 or CELL_DCH state 6), the scheduler should be provided with information about the UE 14's buffer status (e.g., how much data does it need to transmit) and power availability information (e.g., can a given UE increase its transmit power given its own, inherent transmit capabilities). In order to enable scheduling of uplink transmissions, a NodeB 10 transmits scheduling grant messages to UEs 14 and receives scheduling request messages from the UEs 14 as shown in FIG. 3. The scheduling grant messages inform the UEs 14 of the upper limit on their E-DCH data rates, but permit the UEs 14 to select an E-DCH transport format combination (E-TFC) for usage in performing uplink transmissions on the E-DCH within the constraints placed upon them by the scheduler. If needed, a UE 14 may send a scheduling request to ask for a higher data rate limit than that indicated in its received grant message.

Figure 4:
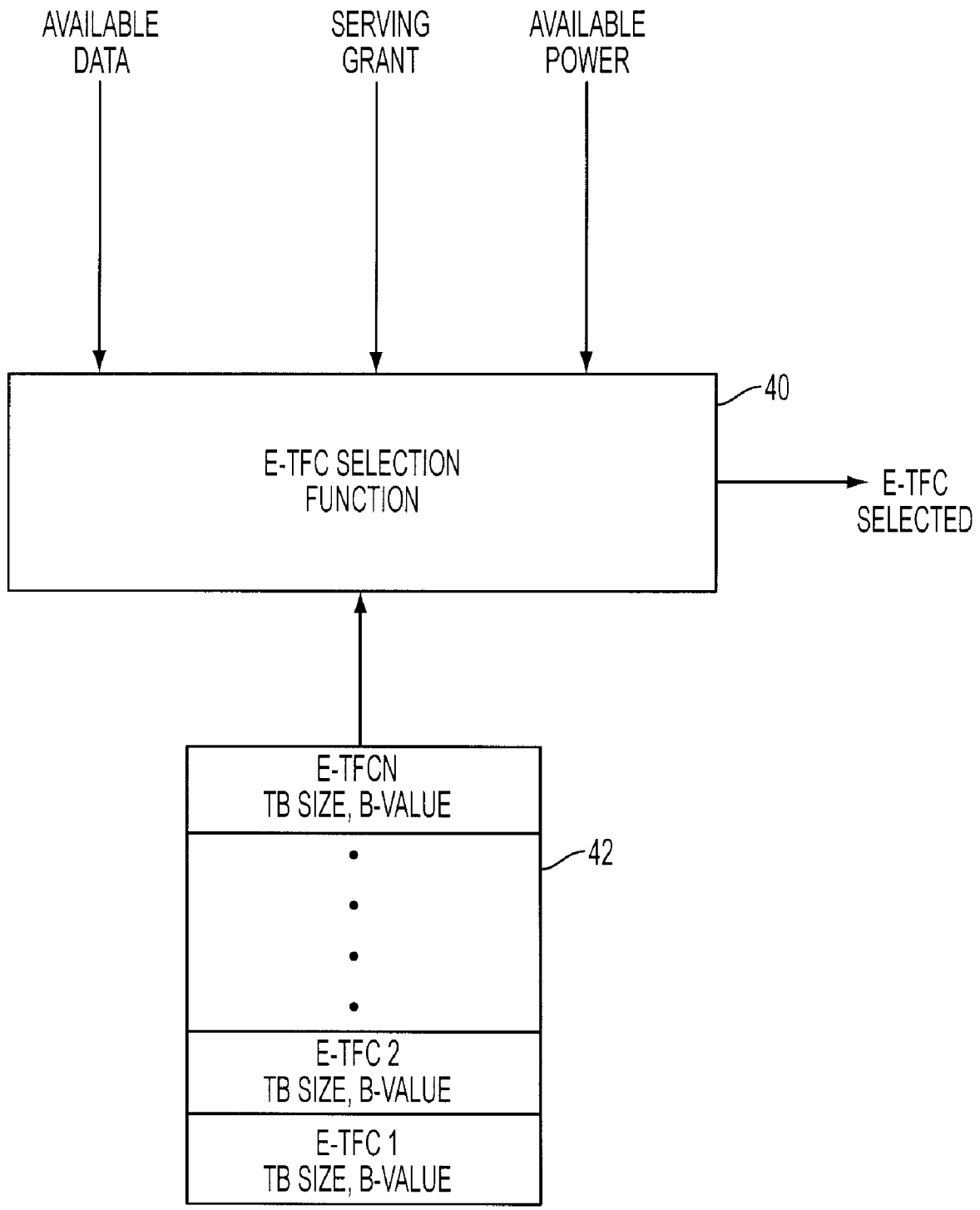
FIG. 4 shows an E-TFC selection function.

The UE 14 uses its received scheduling grant to select one of a number of different E-TFC combinations for transmission on the uplink E-DCH. For example, as shown in FIG. 4, the UE 14's selection function 40 can consider the available data in its data storage buffers, the serving grant limitation, and its available transmit power to select one of a plurality of different E-TFCs. Each candidate E-TFC has associated therewith a transport block size (TBS) and associated E-DP-DCH-to-DPCCH power offset (P value) as shown in table 42.

As mentioned above, recent additions to the WCDMA standards enable UEs 14 in the CELL_FACH state 4 to transmit and receive at higher data rates using, on the uplink, a shared E-DCH channel. Given that the limiting, shared resource on the uplink is interference at the NodeB 10, it is desirable according to these exemplary embodiments to consider, monitor and control the uplink interference contributions which will be added to such systems by users in the CELL_FACH state 4. According to an exemplary embodiment of the present invention, signaling support is provided which enables the RNC 18 to signal a maximum TBS to the NodeB 10 for CELL_FACH users or UEs 14 which are using the Enhanced Uplink, e.g., especially users located on or near the cell edge. The introduction of this new signalling of, among other things described below, a maximum TBS value for all users operating in the CELL_FACH state 4 or, alternatively, only for cell edge users operating in the CELL_FACH state 4 allows, for example, the RNC 18 to control the intercell interference associated with such transmissions.

According to one exemplary embodiment, the RNC 18 decides the maximum TBS value in a cell 22 and signals this value to the NodeB 10 via the Iub interface using, for example, Node B Application Part (NBAP) signaling e.g., Cell Setup and Cell Reconfiguration procedures (CELL SETUP REQUEST and CELL RECONFIGURATION REQUEST messages) or Iur/Iub interface(s) using, for example, Radio Network Subsystem Application Part (RNSAP) and Node B Application Part (NBAP) signaling, e.g., Radio Link Setup, Radio Link Addition, Synchronised Radio Link Reconfiguration Preparation and Unsynchronised Radio Link Reconfiguration procedures. In order to generate a maximum TBS value, the RNC 18 makes use of information about the conditions in neighboring cells that is available from existing NodeB measurements and indicators, e.g., by utilizing Received Scheduled EDCH Power Share (RSEPS) measurements, Received Total Wideband Power (RTWP), Reference Received Total Wideband Power (Reference RTWP), etc. Thus, the RNC 18 can determine appropriate maximum TBS values for the various NodeBs 10 and then transmit them to the NodeBs 10 which are under its supervision. If the NodeB 10 measurements indicate that a cell 22 is experiencing high intercell interference, e.g., through an RTWP measurement result that significantly exceeds the Reference RTWP, the RNC 18 can try to improve the intercell interference situation towards that cell by indicating a conservative MAX TBS value to be used in neighboring cells or neighboring NodeBs. Alternatively, there could be other ways to estimate that a cell 22 has an interference problem, e.g., if the RNC 18 notices that UEs 14 in the cell have difficulty maintaining quality in terms of bit error rate, block error rate, average number of retransmissions or SIR error (i.e., SIR minus SIR target).

Figure 5:
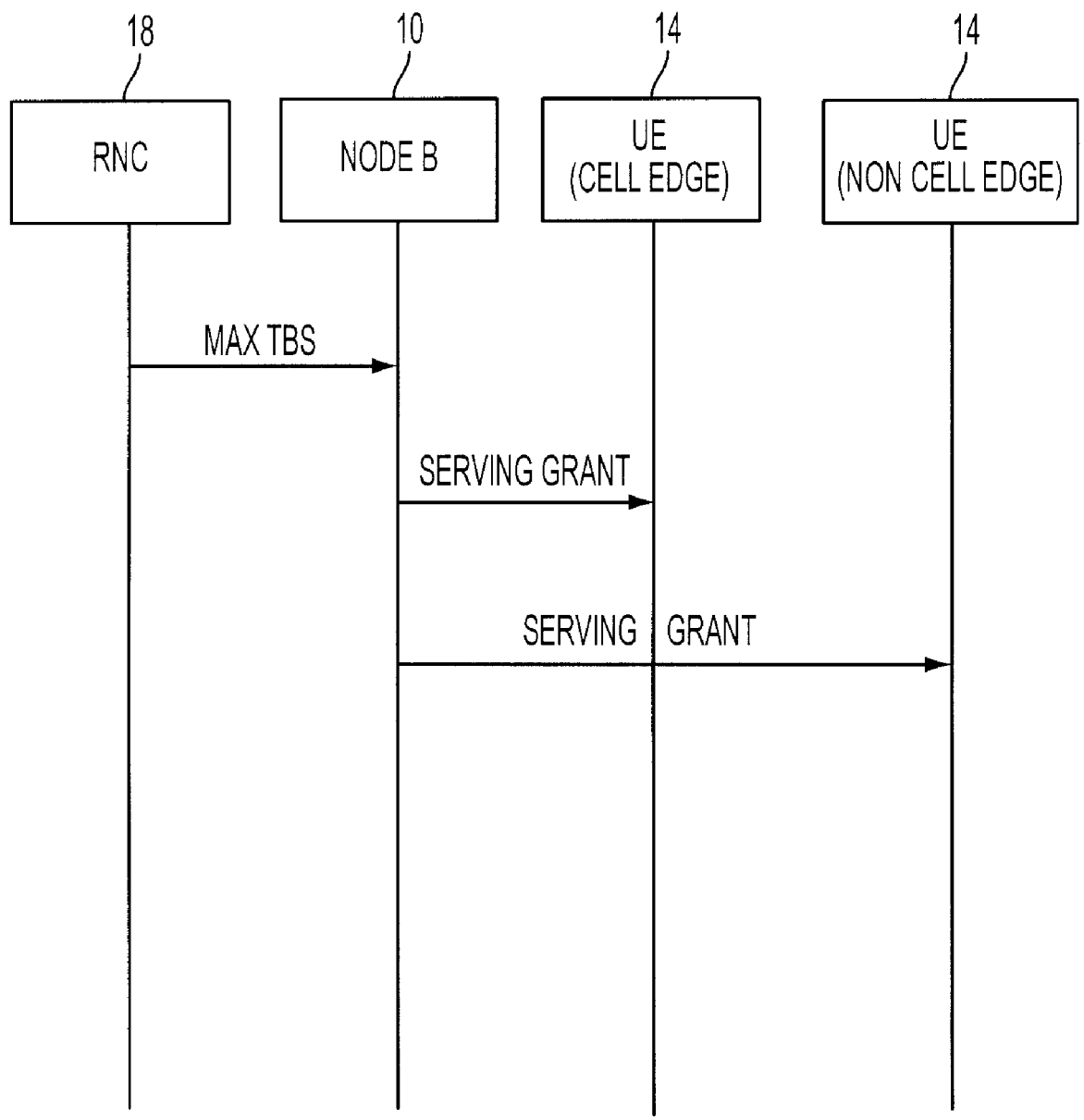
FIG. 5 depicts signaling associated with an exemplary embodiment.

Exemplary signaling for such maximum TBS values, or more generally throughput parameters, is shown generically in the signaling diagram of FIG. 5. However, it will be appreciated that the MAX TBS value may be conveyed as an information element (IE) of another signal, e.g., the CELL SETUP REQUEST and/or the CELL RECONFIGURATION REQUEST messages mentioned above. The NodeB 10 uses this maximum TBS information to determine one (or more) appropriate Serving Grants which are then transmitted to the UEs 14 in this cell 22. For example, the Serving Grants shown in FIG. 5 may be formulated by the NodeB 10 in such a way that they place a limit on the E-TFC (or E-TFCI) selected by the UE 14, which limit corresponds to the MAX TBS value received from the RNC 18. The maximum TBS value which is conveyed by the Serving Grant to a UE 14 at the cell edge may be the same as, or different than, a maximum TBS value which is transmitted to a UE 14 which is not at the cell edge, as will be described below.

According to one exemplary embodiment, the NodeB 10's scheduler strictly follows its received TBS limitation, i.e., the NodeB 10 will not permit the UEs 14 to transmit transport blocks on the E-DCH which exceed the maximum TBS indicated by the RNC 18. However, according to another exemplary embodiment, the NodeB 10's scheduler considers the signaled maximum TBS as a recommendation rather than as an absolute requirement and uses this information in the scheduling process to determine appropriate serving grants for the UEs 14. The maximum TBS value can be updated by the RNC 18 when needed and this updating can be performed done via appropriate NBAP or RNSAP/NBAP signaling procedure(s) via the Iub or Iur/Iub interfaces. The signaling load on Iub/Iur for this updating procedure is anticipated to be relatively low since the adjustment of the TBS value is expected to occur rather infrequently.

Maximum TBS values can be established in a variety of different ways relative to the users or UEs 14 in a given cell 22 according to these exemplary embodiments including, but not limited to:

(1) the RNC 18 setting and transmitting one maximum TBS value per NodeB 10 to limit all EUL in CELL_FACH users/UEs 14 to transmitting transport blocks which are no greater than the maximum TBS value;

(2) the RNC 18 setting and transmitting one maximum TBS value per NodeB 10 to limit all EUL in CELL_FACH users/UEs 14 at the cell edge to transmitting transport blocks which are no greater than the maximum TBS value (i.e., according to this exemplary embodiment, non-cell edge users/UEs 14 will not be limited by the maximum TBS value transmitted from the RNC, although they may still have some TBS limit based upon the E-TFC selection process described above with respect to FIG. 4); and/or (3) the RNC 18 setting and transmitting two maximum TBS values per NodeB 10 to limit all EUL in CELL_FACH non-cell edge users/UEs 14 (a first value) and all EUL in CELL_FACH users/UEs 14 at the cell edge (a second value which is different than the first value). The maximum TBS values for different NodeBs 10 may be different from one another or the same. Additionally, an RNC 18 may establish a group of maximum TBS values for sets of cells 22 or NodeBs 10.

Although the foregoing exemplary embodiments provide examples in the context of an RNC 18 limiting TBS values to control, e.g., intercell interference, it will be appreciated that the present invention is not limited thereto. For example, according to other exemplary embodiments, the RNC 18 may instead determine, and subsequently send to its NodeBs 10, limitation(s) associated with a property or parameter which is different than the TBS, e.g. a permissible uplink bit rate, a parameter associated with the scheduling grant, a parameter associated with E-TFC or E-TFCI selection, a parameter associated with E-DPDCH-to-DPCCH power ratio, and/or a parameter associated with the noise rise. As used herein, the phrase "throughput parameter" is intended to be generic to these exemplary properties or parameters as well as others not explicitly mentioned herein.

Figure 6:
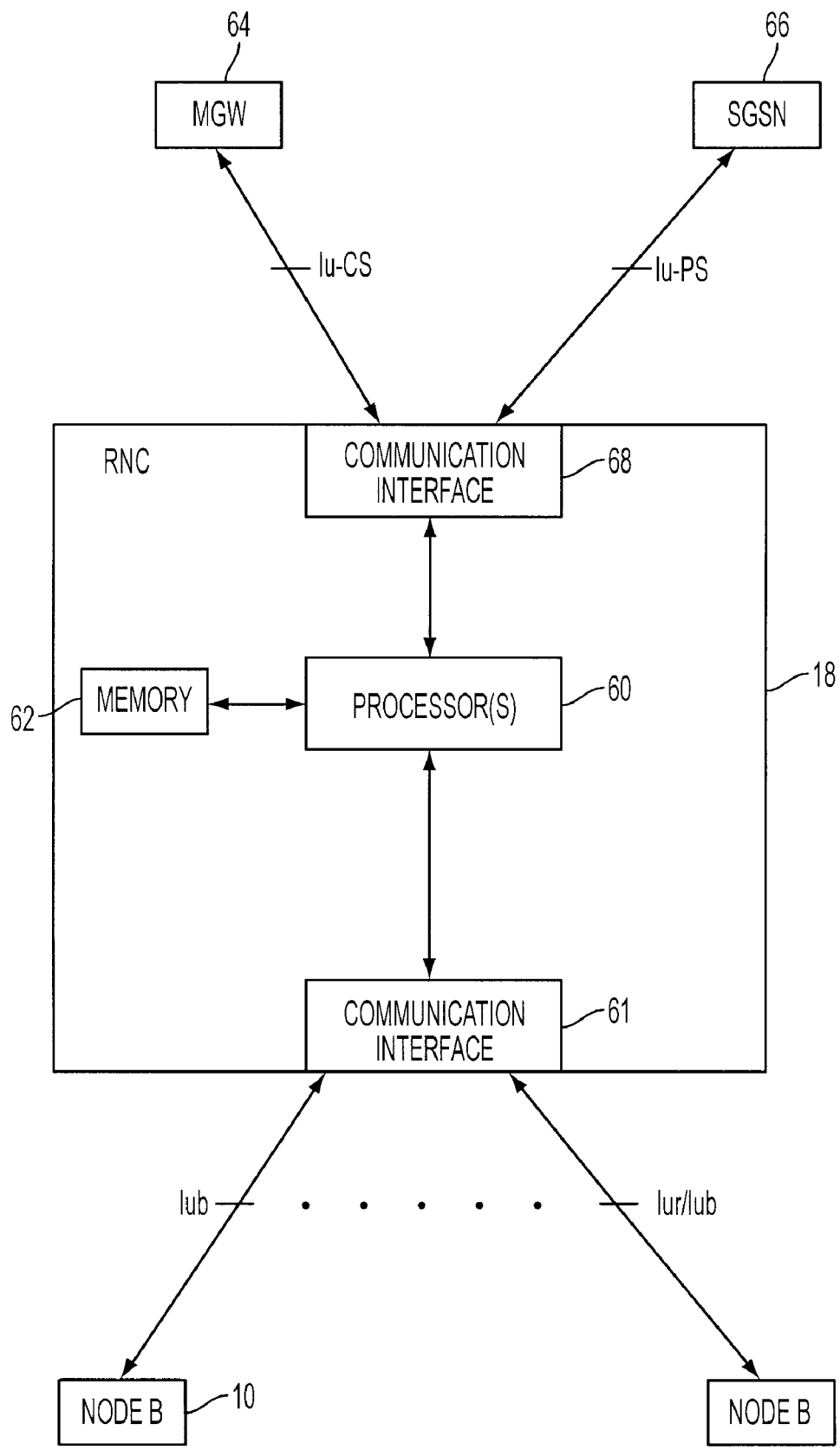
FIG. 6 shows a radio network controller (RNC) in which exemplary embodiments may be implemented.

FIG. 6 shows a generic structure of an exemplary RNC 18 which can determine and transmit at least one such throughput parameter according to these exemplary embodiments. Therein, a processor 60 (or multiple processors or cores) controls one or more network nodes, e.g., NodeB 10s, by determining at least one throughput parameter associated with transmissions by user equipment on an uplink channel when that user equipment is operating in a random access state. The RNC 18's processor 60 transmits the at least one throughput parameter toward the one or more network nodes 10 via a communication link, e.g., fiber optic link, using a communication interface 61 associated with those nodes, e.g., using the Iub or Iur/Iub standardized protocols. The RNC 18 may include many other elements or devices therein which cooperate to perform the aforedescribed functionality, e.g., one or more memory devices 62, and will be connected to the core network, e.g., for circuit-switched communications via a media gateway (MGW) 64 and for packet-switched communications via a serving GPRS support node (SGSN) 66 using suitable interfaces 68 as shown.

Figure 7:
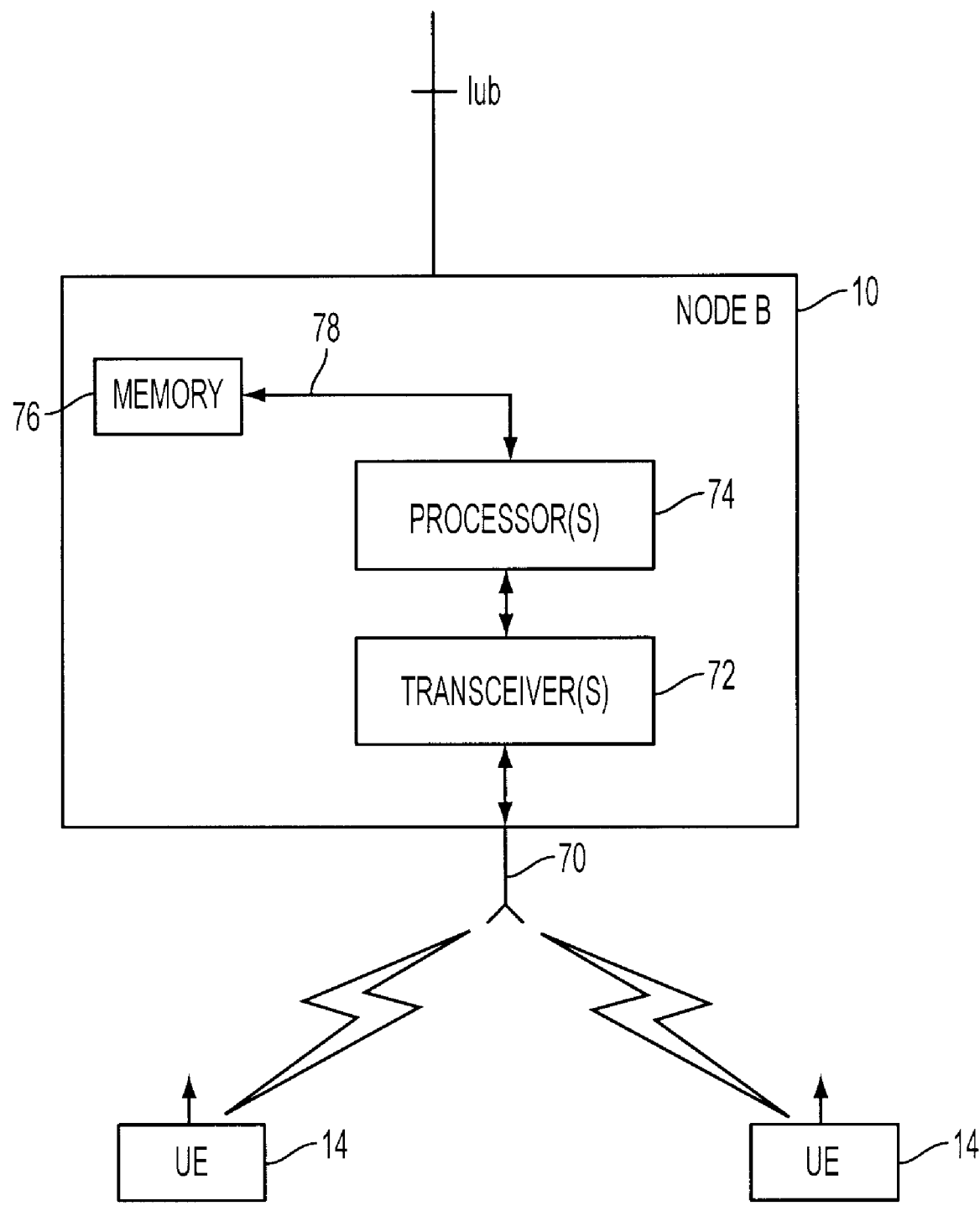
FIG. 7 shows a NodeB in which exemplary embodiments may be implemented.

Similarly, a network node 10 which receives the throughput parameter from the RNC 18 is generically illustrated in FIG. 7. Therein, the NodeB 10 includes one or more antennas 70 connected to processor(s) 74 via transceiver(s) 72. The processor 74 is configured to analyze and process signals received over an air interface via the antennas 70, as well as those signals received from the RNC 18 via e.g. wireline. The processor(s) 74 may also be connected to one or more memory device(s) 76 via a bus 78. Further units or functions, not shown, for performing various operations as encoding, decoding, modulation, demodulation, encryption, scrambling, preceding, etc. may optionally be implemented not only as electrical components but also in software or a combination of these two possibilities as would be appreciated by those skilled in the art to enable the transceiver(s) 72 and processor(s) 74 to process uplink and downlink signals.

Figure 8:
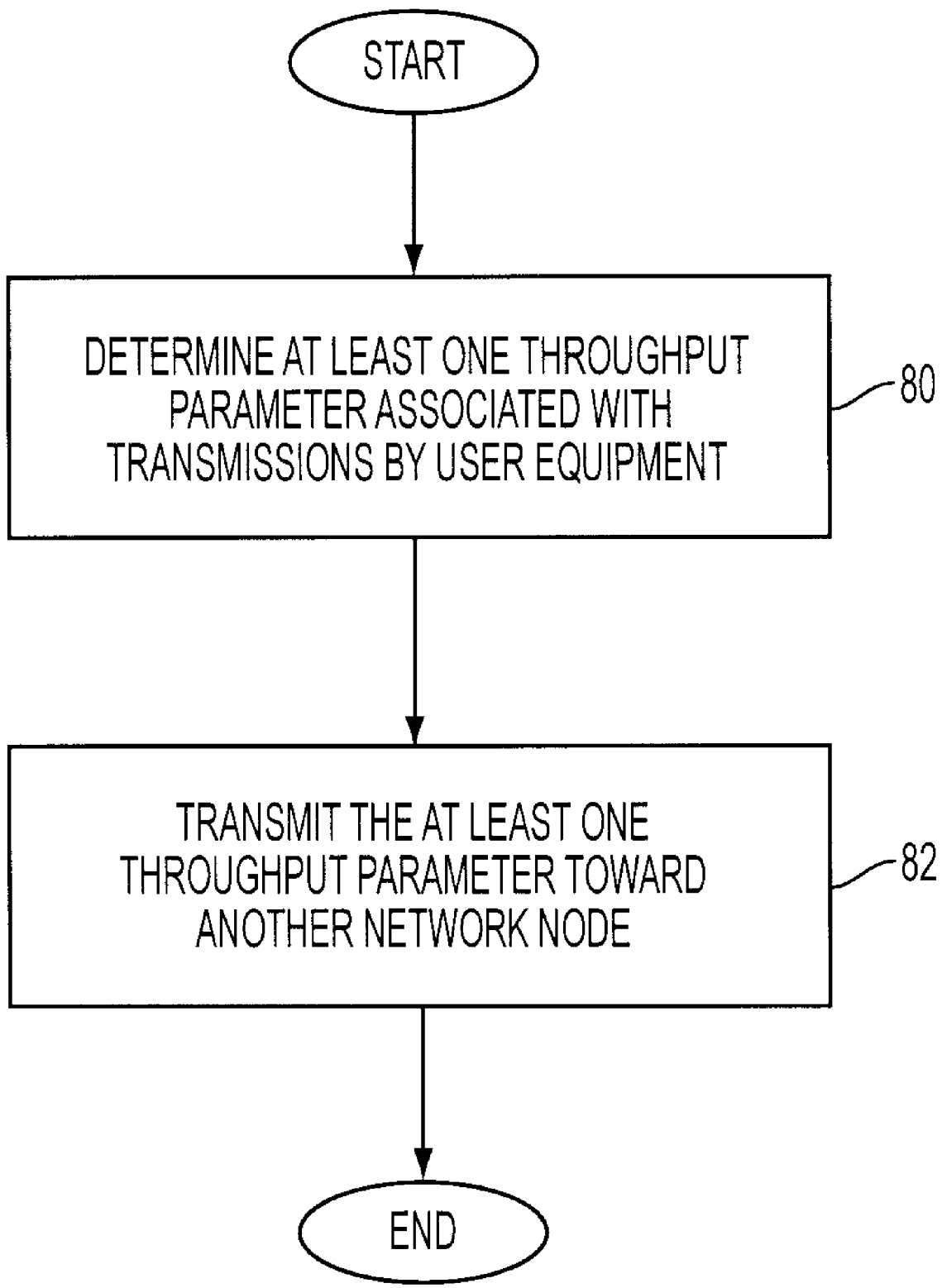
FIG. 8 is a flowchart illustrating a method for communicating according to an exemplary embodiment.

Thus, according to an exemplary embodiment, a method includes the steps illustrated in the flowchart of FIG. 8. Therein, at step 80, an RNC determines at least one throughput parameter associated with transmissions by user equipment on an uplink channel. Then, at step 82, the RNC transmits the at least one throughput parameter toward another network node, e.g., a NodeB 10. As will be appreciated by those skilled in the art, methods such as that illustrated in FIG. 8 can be implemented completely or partially in software. Thus, systems and methods for processing data according to exemplary embodiments of the present invention can be performed by one or more processors executing sequences of instructions contained in a memory device. Such instructions may be read into the memory device 76 from other computer-readable mediums such as secondary data storage device(s), which may be fixed, removable or remote (network storage) media. Execution of the sequences of instructions contained in the memory device causes the processor to operate, for example, as described above. In alternative embodiments, hard-wire circuitry may be used in place of or in combination with software instructions to implement exemplary embodiments.

Figure 9:
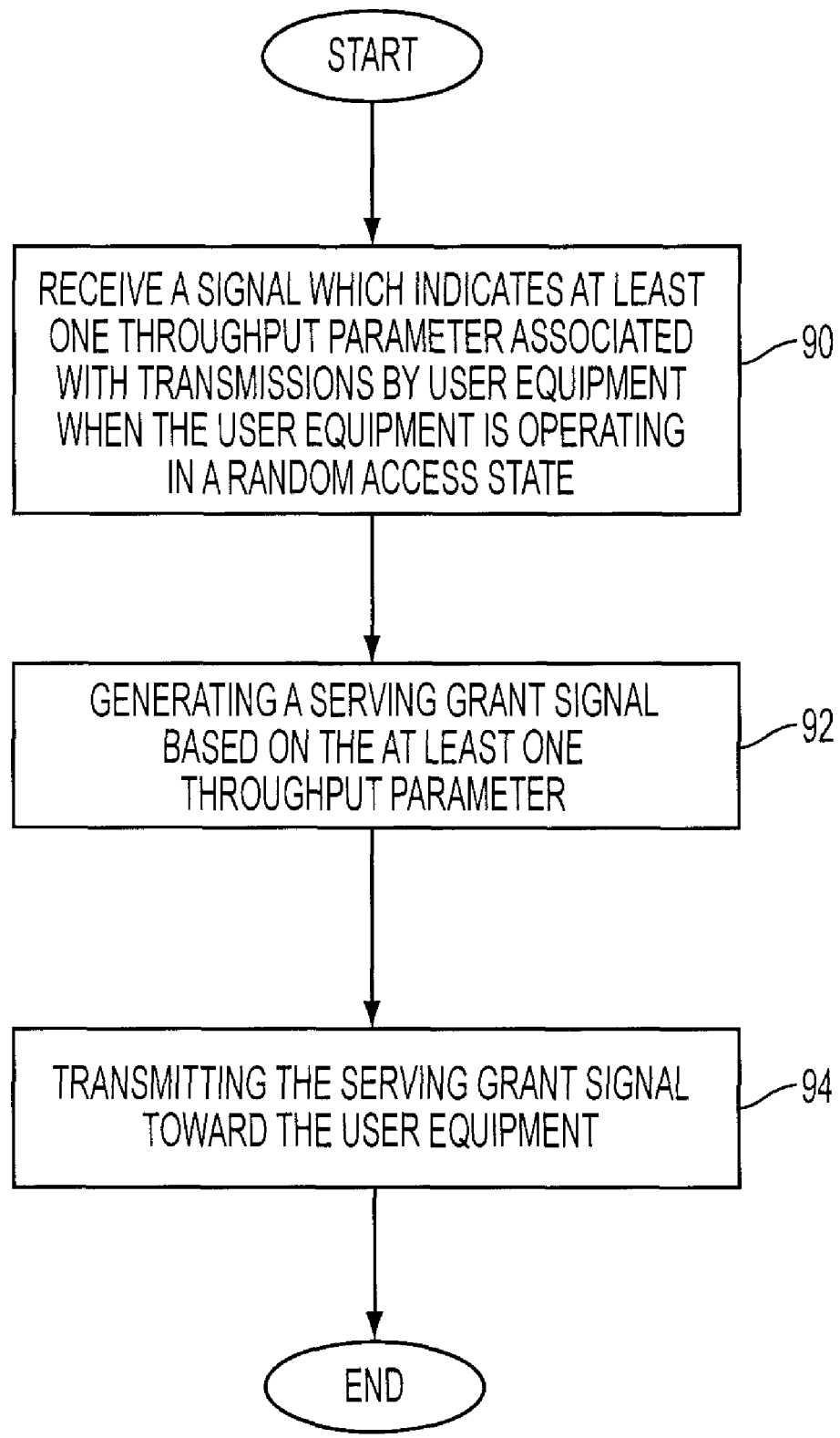
FIG. 9 is a flowchart illustrating another method for communicating according to an exemplary embodiment.

The flowchart of FIG. 9 illustrates another method according to an exemplary embodiment. Therein, at step 90, a signal is received which indicates at least one throughput parameter, e.g., a maximum TBS and/or other parameter, associated with transmissions by user equipment when the user equipment is operating in a random access state. A serving grant signal is generated, at step 92, based on the at least one throughput parameter. This serving grant signal is transmitted, at step 94, toward the user equipment.

The above-described exemplary embodiments are intended to be illustrative in all respects, rather than restrictive, of the present invention. Thus numerous variations and modifications to the above-described exemplary embodiments may be made. For example, although the foregoing exemplary embodiments illustrate the controlling node, i.e., the node which generates the at least one throughput parameter, as being the RNC 18, the present invention is not so limited. The controlling node may, instead, be a base station, e.g., in systems such as WCDMA, LTE, IMT-Advanced, etc. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method comprising:
   determining, at a radio network controller (RNC) two maximum transport block size (TBS) values per NodeB, wherein said two maximum TBS values are associated with transmissions by user equipment on an enhanced dedicated channel (E-DCH) when said user equipment is operating in a CELL_FACH state, said two maximum TBS values including:
   (a) a first maximum TBS value for users operating in said CELL_FACH state that are located at a cell edge; and
   (b) a second maximum TBS value for users operating in said CELL_FACH state that are not located at said cell edge; the method further comprising:
   transmitting, from said RNC, said two maximum TBS values toward each NodeB.

2. The method of claim 1, wherein said step of determining further comprises:
   using at least one of: Received Scheduled EDCH Power Share, RSEPS, measurements, Received Total Wideband Power, and Reference Received Total Wideband Power to determine said two maximum TBS values.

3. The method of claim 2, further comprising:
   receiving, at said NodeB, said two maximum TBS values; and
   transmitting, by said NodeB, a scheduling grant toward at least some of said user equipment which are located at a cell edge and operating in said CELL_FACH state, which scheduling grant limits said user equipment to transmissions on said E-DCH having block sizes which are no greater than said first maximum TBS value.

4. The method of claim 2, further comprising:
   receiving, at said NodeB, said two maximum TBS values; and transmitting, by said NodeB, a scheduling grant toward at least some of said user equipment which are located at a cell edge and operating in said CELL_FACH state, which scheduling grant does not limit said user equipment to transmissions on said E-DCH having block sizes which are no greater than said first maximum TBS value.

5. The method of claim 2, further comprising:
updating said two maximum TBS values associated with transmissions by user equipment on said enhanced dedicated channel.

6. The method of claim 2, wherein said two maximum TBS values are associated with a group of NodeBs and said step of transmitting further comprises:
transmitting, from said RNC, said two maximum TBS values toward said group of NodeBs.

7. The method of claim 1, further comprising:
receiving, at said NodeB, said two maximum TBS values; and
transmitting, by said NodeB, a scheduling grant toward at least some of said user equipment which are located at a cell edge and operating in said CELL_FACH state, which scheduling grant limits said user equipment to transmissions on said E-DCH having block sizes which are no greater than said first maximum TBS value.

8. The method of claim 7, further comprising:
updating said two maximum TBS values associated with transmissions by user equipment on said enhanced dedicated channel.

9. The method of claim 7, wherein said two maximum TBS values are associated with a group of NodeBs and said step of transmitting further comprises:
transmitting, from said RNC, said two maximum TBS values toward said group of NodeBs.

10. The method of claim 1, further comprising:
receiving, at said NodeB, said two maximum TBS values; and
transmitting, by said NodeB, a scheduling grant toward at least some of said user equipment which are located at a cell edge and operating in said CELL_FACH state, which scheduling grant does not limit said user equipment to transmissions on said E-DCH having block sizes which are no greater than said first maximum TBS value.

11. The method of claim 10, further comprising:
updating said two maximum TBS values associated with transmissions by user equipment on said enhanced dedicated channel.

12. The method of claim 10, wherein said two maximum TBS values are associated with a group of NodeBs and said step of transmitting further comprises:
transmitting, from said RNC, said two maximum TBS values toward said group of NodeBs.

13. The method of claim 1, further comprising:
updating said two maximum TBS values associated with transmissions by user equipment on said enhanced dedicated channel.

14. The method of claim 13, wherein said two maximum TBS values are associated with a group of NodeBs and said step of transmitting further comprises:
transmitting, from said RNC, said two maximum TBS values toward said group of NodeBs.

15. The method of claim 1, wherein said two maximum TBS values are associated with a group of NodeBs and said step of transmitting further comprises:
transmitting, from said RNC, said two maximum TBS values toward said group of NodeBs.

16. A radio network controller (RNC), comprising:
a processor for controlling one or more NodeBs;
wherein said processor is adapted to determine two maximum (TBS) values per NodeB, wherein said two maximum TBS values are associated with transmissions by user equipment on an enhanced dedicated channel (E-DCH) when said user equipment is operating in a CELL_FACH state, said two maximum TBS values per NodeB including:
(a) a first maximum TBS value for users operating in said CELL_FACH state that are located at a cell edge; and
(b) a second maximum TBS value for users operating in said CELL_FACH state that are not located at said cell edge; and
said processor being further adapted to transmit said two maximum TBS values toward said one or more NodeBs.

17. The RNC of claim 16, wherein said processor is further adapted to associate said two maximum TBS values with a group of NodeBs to transmit said two maximum TBS values toward said group of NodeBs.

18. A network node comprising:
an interface configured to send and receive signals;
a transceiver adapted to send and receive signals over an air interface toward and from a user equipment; and
a processor, connected to said transceiver;
wherein said interface is configured to receive a signal which indicates two maximum transport block size (TBS) values, said two maximum TBS values being associated with transmissions by user equipment on an enhanced dedicated channel (E-DCH) when said user equipment is operating in a CELL_FACH state, said two maximum TBS values including:
(a) a first maximum TBS value for users operating in said CELL_FACH state that are located at a cell edge; and
(b) a second maximum TBS value for users operating in said CELL_FACH state that are not located at said cell edge; and
wherein said processor is adapted to process said two maximum TBS values and to generate a serving grant signal based on said two maximum TBS values;
wherein said transceiver transmits said serving grant signal toward said user equipment.

19. The network node of claim 18, wherein said processor is further adapted to generate said serving grant to limit said user equipment to transmissions on said enhanced dedicated channel (E-DCH) having block sizes which are no greater than said first maximum TBS value, said user equipment being located at a cell edge.

20. A method comprising:
receiving a signal which indicates two maximum transport block size (TBS) values, said two maximum TBS values being associated with transmissions by user equipment on an enhanced dedicated channel (E-DCH) when said user equipment is operating in a CELL_FACH state, said two maximum TBS values including:
(a) a first maximum TBS value for users operating in said CELL_FACH state that are located at a cell edge; and
(b) a second maximum TBS value for users operating in said CELL_FACH state that are not located at said cell edge; the method further comprising:
generating a serving grant signal based on said two maximum TBS values; and
transmitting said serving grant signal toward said user equipment.

21. The method of claim 20, further comprising:
receiving said two maximum TBS values over an Iub interface using at least one of Radio Network Subsystem Application Part, RNSAP, and Node B Application Part, NBAP, signaling.

22. The method of claim 21, further comprising:
generating said serving grant to limit said user equipment to transmissions on said enhanced dedicated channel (E-DCH) having block sizes which are no greater than said first maximum TBS value, said user equipment being located at a cell edge.

23. The method of claim 21, further comprising:
generating said serving grant which does not limit said user equipment to transmissions on said enhanced dedicated channel (E-DCH) having block sizes which are no greater than said first maximum TBS value, said user equipment being located at a cell edge.

24. The method of claim 21, wherein said step of receiving further comprises:
receiving, as said signal which indicates said two maximum TBS values associated with transmissions by said user equipment on said uplink channel when said user equipment is operating in a CELL_FACH state, one of a cell setup message and a cell reconfiguration message.

25. The method of claim 20, further comprising:
generating said serving grant to limit said user equipment to transmissions on said enhanced dedicated channel (E-DCH) having block sizes which are no greater than said first maximum TBS value, said user equipment being located at a cell edge.

26. The method of claim 25, further comprising:
generating said serving grant which does not limit said user equipment to transmissions on said enhanced dedicated channel (E-DCH) having block sizes which are no greater than said first maximum TBS value, said user equipment being located at a cell edge.

27. The method of claim 25, wherein said step of receiving further comprises:
receiving, as said signal which indicates said two maximum TBS values associated with transmissions by said user equipment on said uplink channel when said user equipment is operating in a CELL_FACH state, one of a cell setup message and a cell reconfiguration message.

28. The method of claim 20, further comprising:
generating said serving grant which does not limit said user equipment to transmissions on said enhanced dedicated channel (E-DCH) having block sizes which are no greater than said first maximum TBS value, said user equipment being located at a cell edge.

29. The method of claim 28, wherein said step of receiving further comprises:
receiving, as said signal which indicates said two maximum TBS values associated with transmissions by said user equipment on said uplink channel when said user equipment is operating in a CELL_FACH state, one of a cell setup message and a cell reconfiguration message.

30. The method of claim 20, wherein said step of receiving further comprises:
receiving, as said signal which indicates said two maximum TBS values associated with transmissions by said user equipment on said uplink channel when said user equipment is operating in a CELL_FACH state, one of a cell setup message and a cell reconfiguration message.

* * * * *

UNITED STATES PATENT AND TRADEMARK OFFICE
CERTIFICATE OF CORRECTION

PATENT NO. : 7,885,212 B2  Page 1 of 1
APPLICATION NO. : 12/337276
DATED : February 8, 2011
INVENTOR(S) : Gerstenberger et al.

It is certified that error appears in the above-identified patent and that said Letters Patent is hereby corrected as shown below:

In Column 5, Line 22, delete "(P value)" and insert -- (β value) --, therefor.

In Column 7, Line 47, delete "preceding," and insert -- precoding, --, therefor.

In Column 11, Line 2, in Claim 21, delete "lub" and insert -- Iub --, therefor.

Signed and Sealed this
Fourth Day of October, 2011

David J. Kappos
*Director of the United States Patent and Trademark Office*